United States Patent

Granger

[15] 3,663,171

[45] May 16, 1972

[54] METHOD OF MANUFACTURING UNITARY POROUS CARBON BODIES

[72] Inventor: Anthony F. Granger, Great Bookham, England

[73] Assignee: Coal Industry (Patents) Limited, London, England

[22] Filed: July 24, 1970

[21] Appl. No.: 58,151

[30] Foreign Application Priority Data

Aug. 12, 1969  Great Britain......................40,276/69

[52] U.S. Cl................................23/209.1, 252/421, 264/29
[51] Int. Cl. .....................................C01b 31/08, B29c 25/00
[58] Field of Search..........................23/209.4, 209.6, 209.1; 252/421; 264/29

[56] References Cited

UNITED STATES PATENTS 3,558,276   1/1971   Sugio Otani..........................23/209.1

FOREIGN PATENTS OR APPLICATIONS 18,876   2/1935   Australia..............................23/209.1

Primary Examiner—Oscar R. Vertiz
Assistant Examiner—Hoke S. Miller
Attorney—Stevens, Davis, Miller & Mosher

[57] ABSTRACT

A method for the manufacture of the porous carbon body comprises sintering a particulate pitch-like material, for example an extract or solution of coal, at a temperature below that at which the material melts to produce a green compact, oxidizing the green compact to stabilize the green compact to heat treatment, and carbonizing the stabilized green compact.

7 Claims, No Drawings

METHOD OF MANUFACTURING UNITARY POROUS CARBON BODIES

OBJECTS OF THE INVENTION

It is an object of the present invention to produce a porous carbon body suitable for use as a filter.

It is a further object of the present invention to produce a porous carbon body having high porosity and high strength.

It is a further object of the present invention to produce a porous carbon body in a high yield, based on the carbon employed.

It is a further object of the invention to produce an activated porous carbon body of high strength.

Other and further objects of the invention will be apparent to those of skill in the art from the following description.

DETAILED DESCRIPTION OF THE INVENTION

According to the invention a method for the manufacture of a porous carbon body comprises sintering a particulate pitch-like material at a temperature below that at which the material melts to produce a green compact, oxidizing the green compact to stabilize the green compact to heat treatment, and carbonizing the stabilized green compact.

The term "pitch-like material" is intended to include substances such as coal extracts and solutions of coal, coal-tar pitches, petroleum pitches, asphalt and bitumen, and materials produced as by-products in various industrial production processes and mixtures thereof. Such materials comprise, mainly, carbon, hydrogen and oxygen, and often are of high molecular weight and are aromatic in character.

Such pitch-like materials often do not have melting points but have a range over which they soften. It will be clear to those skilled in the art that the temperature at which the material is sintered must be so carefully chosen that the material does not soften to such an extent that insufficient porosity is obtained in the green compact. If too low a temperature is employed the particles of the pitch-like material will not bond together sufficiently to produce a strong green compact. Accordingly it is suggested that where the pitch-like material melts or softens over a relatively narrow range, a temperature of about 5° to 10° C below the melting or softening point of the pitch-like material is generally suitable.

In general it will be found convenient to sinter the pitch-like material under pressure in a mould. This is not, however, essential, and the particulate, pitch-like material can be compacted, suitably in a mould, under pressure, and, if the compact so made is sufficiently strong, then removed from the mould for sintering.

The green compact is then oxidized to stabilize it to heat treatment. This is carried out at below the melting point of the green compact. The temperature and time of the oxidation will depend upon the pitch-like material employed. The higher the melting point of the pitch-like material employed, the higher the maximum temperature at which the oxidation may be carried out, and the faster the oxidation can generally be. It is in general preferred to oxidize at the maximum temperature possible, for as short a time as possible, at least for economic reasons. However, it is often possible to carry out the oxidation at temperatures below the maximum possible for a longer time. It will, however, be understood that there will be a temperature at which no, or substantially no, oxidation will take place. For oxidation, it is normally preferred to employ a gas containing molecular oxygen, for example, air or oxygen. However, other oxidizing agents may be employed.

It the green compact is insufficiently oxidized the green compact will melt on heat treatment. However, if it is over-oxidized oils will be removed from the pitch-like material, which would result in cracking of the green compact.

The green compact so stabilized may be carbonized by heat treatment to a temperature of, for example, 800° C to 1000° C. We have, suprisingly, found that it may be advantageous to heat the stabilized green compact in a gas containing molecular oxygen at a temperature of 400° C to 600° C before continuing the heat treatment in an inert atmosphere up to about 800° C to 100° C. This appears to have the effect of diminishing the carbon loss on carbonization. Suitably the gas containing molecular oxygen is air. Conveniently the inert atmosphere may be nitrogen, or air from which oxygen has been removed. It is generally preferred to carry out this heating process at a relatively slow rate in order to minimize strains in the stabilized green compact. The porous body may be cooled, if desired, or may be treated in a manner as hereafter described without further cooling.

The porous carbon body so formed may be activated, for example, by any method known for activation of carbon bodies. One method of activating carbon is by heating the carbon at 800° to 950° C, in steam, as an activating gas. This process considerably enhances the specific surface of the body and improves its filtration and sorption properties.

The carbon body may be graphitized by any method known for graphitization of carbon bodies. By means of a process of the present invention a carbon body can be produced of high strength and porosity. Methods hitherto employed have generally given carbon bodies that are of similar strength or of similar porosity, but not both. A further advantage of the present method is that it enables porous carbon bodies to be obtained with a high carbon yield based of the material supplied.

If desired, the pitch-like material may be mixed with a small proportion, preferably not more than about 25 percent, of a finely divided carbon.

The following example illustrates the invention: 1½g of size-graded particles (−150 + 240 B.S.S.) of a coal extract, which was produced from a low-rank coal by extraction with anthracene oil at a temperature of 400° C, were placed in a cylindrical steel mould and a steel plunger was placed on top of the particles.

The extract was sintered initially by rapidly heating it in air to a temperature of 205° C and maintaining this temperature for 1½ hours. During the sintering a pressure of 80 gm/cm² was applied to the particles by means of the plunger. Under the above conditions the particles softened and flowed to produce a green compact. The compact was removed from the mould and subsequently allowed to cool slowly.

This compact was then placed on a flat porous metal sheet and introduced into a furnace for further oxidation at a temperature of 200° C for a period of 1 hour. Again, the compact was allowed to cool to room temperature.

For carbonization, the compact was initially heated in static air up to 300° C at a rate of 1 deg C/min and from 300° C to 600° C at a rate of 0.25 deg C/min, then heated in a nitrogen atmosphere from 600° to 1000° C at a rate of 1 deg C/min. The compact was then allowed to cool slowly to room temperature in the nitrogen atmosphere.

The resulting unitary porous carbon body was found to be 16 percent smaller in diameter than the green compact and 30 percent lighter in weight than the particulate material initially placed in the mould. The pore size of the body varied from 10 – 20 microns and its breaking strength (3 point bending) was 250 kg/cm². The permeability of the body for the passage of air was 0.79 darcysat a flow rate of 2 cc/min, 0.84 darcys at 4 cc/min and 0.86 darcys at 6 cc/min. The body had a density of 0.95 g/cc.

I claim:

1. A method for the manufacture of a porous carbon body which comprises sintering a particulate pitch-like material at a temperature below that at which said particulate pitch-like material melts whereby a green compact is produced, oxidizing said green compact with a gas containing molecular oxygen whereby said green compact is stablized to heat treatment, heating said stablized green compact to a temperature of about 400° C to about 600° C in atmosphere containing molecular oxygen, and carbonizing said stabilized, heat-treated green compact whereby said porous carbon body is formed.

2. A method as claimed in claim 1 wherein said pitch-like material is an extract of coal.

3. A method as claimed in claim 1 wherein said pitch-like material is coal-tar pitch.

4. A method as claimed in claim 1 wherein said step of sintering said particulate pitch-like material is carried out under pressure.

5. A method as claimed in claim 1, wherein the source of said pitch-like material is a solution of coal.

6. A method as claimed in claim 1, wherein said pitch-like material is petroleum pitch.

7. A method for the manufacture of a porous carbon body which comprises sintering a particulate pitch-like material at a temperature below that at which said particulate pitch-like material melts whereby a green compact is produced, oxidizing said green compact with a gas containing molecular oxygen whereby said green compact is stabilized to heat treatment, heating said stabilized green compact to a temperature of about 400° C to 600° C in an atmosphere containing molecular oxygen, carbonizing said stabilized, heat-treated green compact to form the porous carbon body, and activating porous carbon body by heating in steam at about 800° C to about 950° C.

* * * * *